Oct. 6, 1964
W. A. RAY
3,151,531
FLUID PRESSURE OPERATED VALVE POSITIONER
Filed May 29, 1961
4 Sheets-Sheet 2
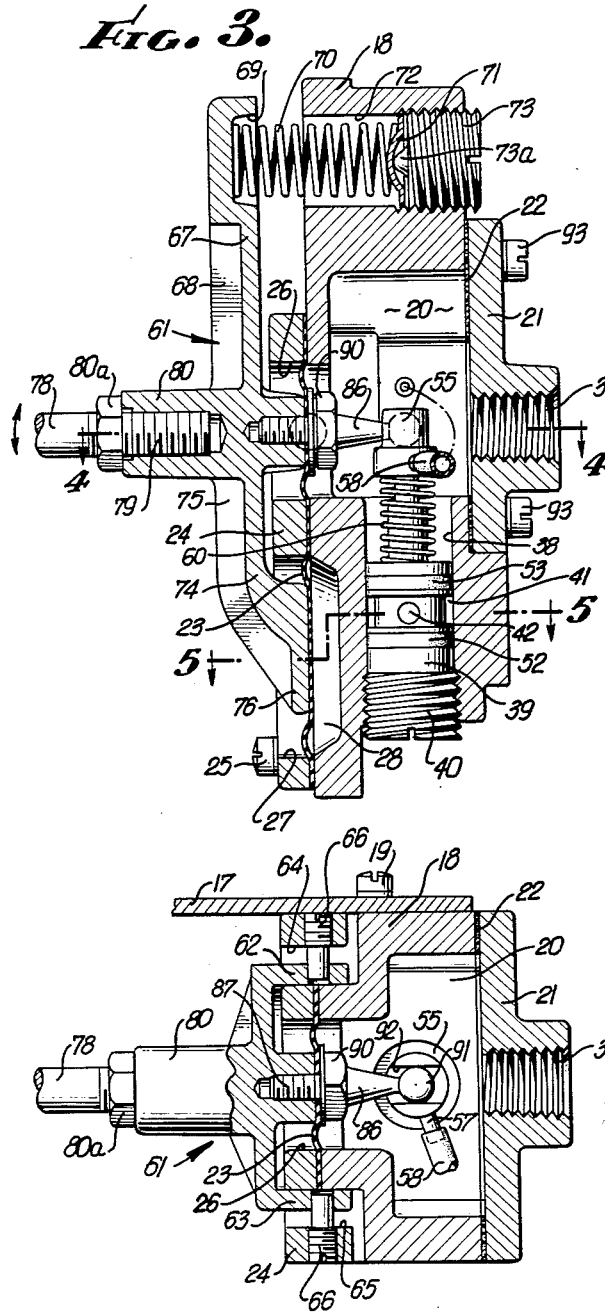
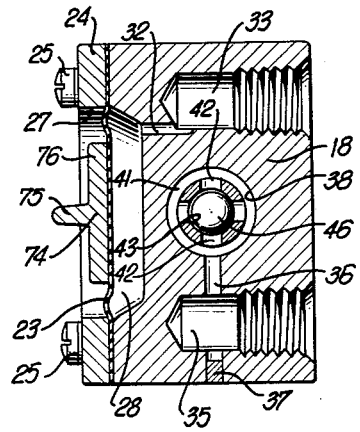
INVENTOR.
WILLIAM A. RAY
BY
Flam and Flam
ATTORNEYS.

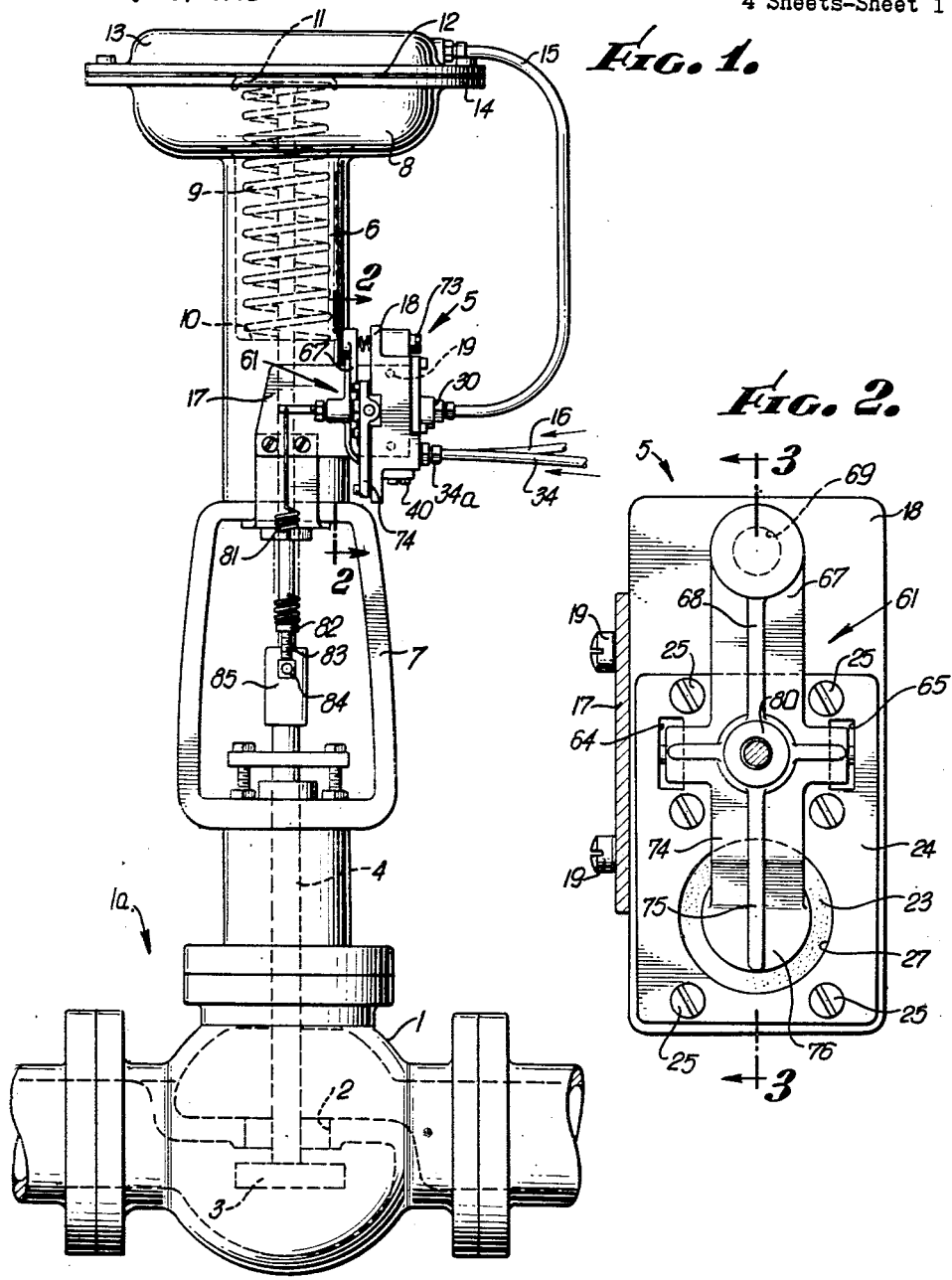

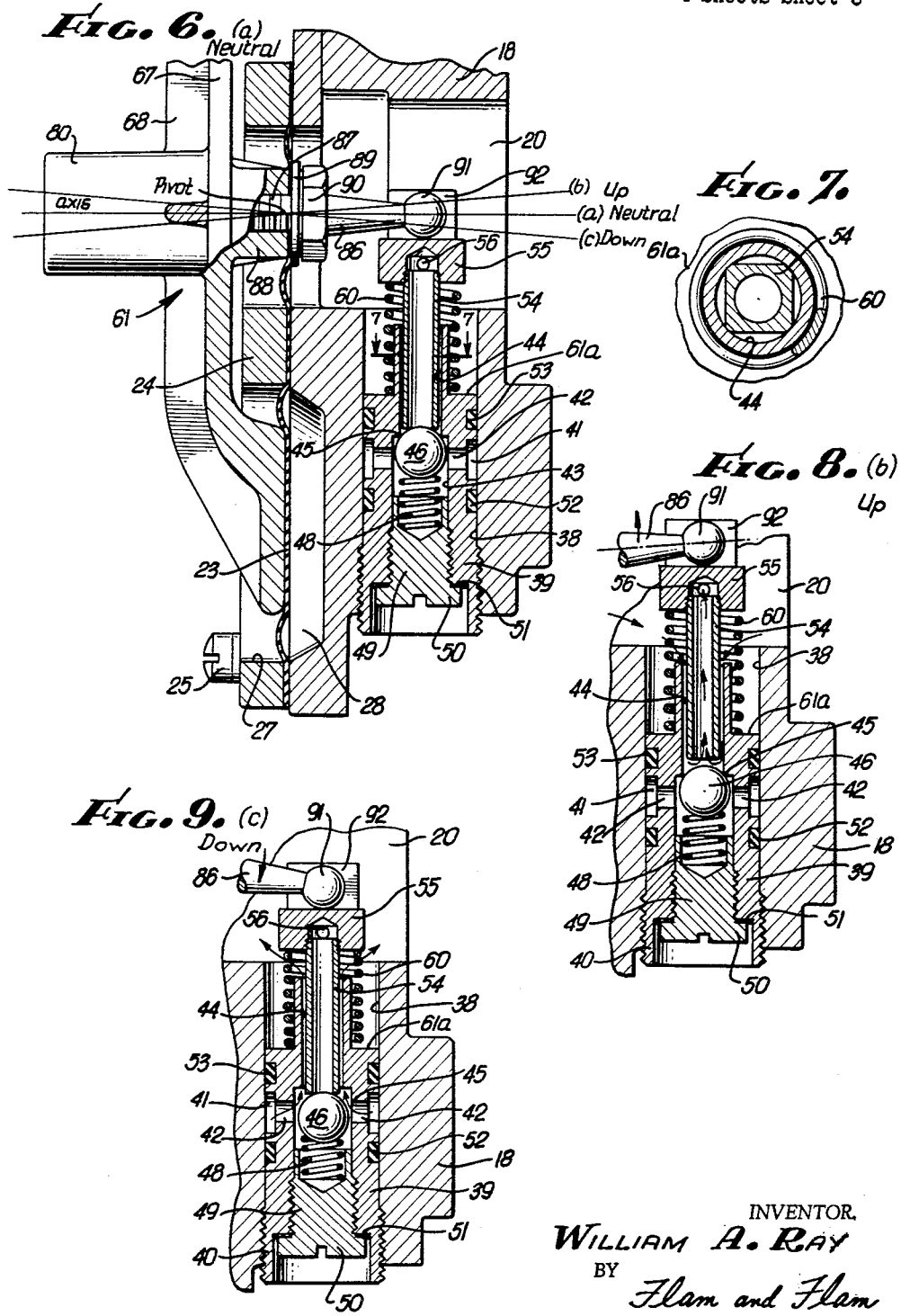

Oct. 6, 1964

W. A. RAY 3,151,531

FLUID PRESSURE OPERATED VALVE POSITIONER

Filed May 29, 1961

Direct Acting

Reverse Acting

INVENTOR.
WILLIAM A. RAY
BY
Flam and Flam
ATTORNEYS.

United States Patent Office 3,151,531
Patented Oct. 6, 1964

3,151,531
FLUID PRESSURE OPERATED VALVE
POSITIONER
William A. Ray, North Hollywood, Calif., assignor to
International Telephone and Telegraph Corporation,
Baltimore City, Md., a corporation of Maryland
Filed May 29, 1961, Ser. No. 113,194
10 Claims. (Cl. 91—387)

This invention relates to valve positioner pilot valves that operate to move a valve closure. Scpecifically such positions often utilize pneumatic power to determine or select the position of a valve, as by moving a valve stem.

For example, it has been customary to cause the valve closure to assume a definite position in response to adjustment or variation in pressure of the "instrument air" that is supplied to the positioner.

This invention has for one of its objects the effective use of such instrument air, as by providing a leverage system affected by the air pressure, the air used to effect movement of the valve stem being directly supplied to the valve structure; and this air is either applied or withdrawn so as to be substantially fully effective on the valve just as soon as the instrument air pressure changes.

As stated hereinabove, usually the stem of the main valve is positioned by aid of the pilot valve. The stem may be actuated in one direction by pneumatic pressure, and in the other direction by release of pneumatic pressure. The valve stem movement thus can respond to a variation of pressure of the instrument air. The movement reacts upon the positioner in such a way as to render the positioner inactive as soon as the stem reaches a definite position corresponding to this air pressure. The mechanism effecting this may be termed a closed-loop servomechanism. The movement of the stem, for example, may be utilized to stress or to reduce the stress of a coiled spring until the force exerted by the spring balances the forces acting on the mechanism to stop further supply or withdrawal of air with respect to the pneumatic main valve operating device.

It is another object of this invention to provide a simplified servomechanism structure, as by using a pivoted lever structure having a plurality of arms. These arms are so affected by pneumatic and spring forces as to be brought to a balanced or quiescent state when the valve stem reaches a definite position. In this position (which may be called a neutral position), the mechanism holds the air in the pneumatic operator so that the stem is subjected to a holding force sufficient to maintain balance of the lever structure.

It is another object of this invention to maintain the valve closure accurately in position, although the pressure of the fluid controlled by the valve may fluctuate or vary.

This invention possesses many other advantages, and has other objects which may be made more clearly apparent from a consideration of one embodiment of the invention. For this purpose, there is shown a form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawings:

FIGURE 1 is an elevation of a valve installation, including a pilot valve for controlling the position of a main valve, and incorporating the invention;

FIG. 2 is a sectional view, taken along the plane corresponding to line 2—2 of FIG. 1, shown on an enlarged scale;

FIG. 3 is a further enlarged sectional view, taken along the plane corresponding to line 3—3 of FIG. 2;

FIG. 4 is a sectional view, taken along the plane corresponding to line 4—4 of FIG. 3;

FIG. 5 is a sectional view, taken along the plane corresponding to line 5—5 of FIG. 3;

FIG. 6 is a still further enlarged fragmentary sectional view, similar to FIG. 3, and illustrating the mechanical lever connection that is interposed between the main valve structure and the pilot valve structure;

FIG. 7 is a detail cross-section, taken along a plane corresponding to line 7—7 of FIG. 6;

FIGS. 8 and 9 are views similar to FIG. 6, illustrating alternative positions of the pilot valve structure;

Figure 10:
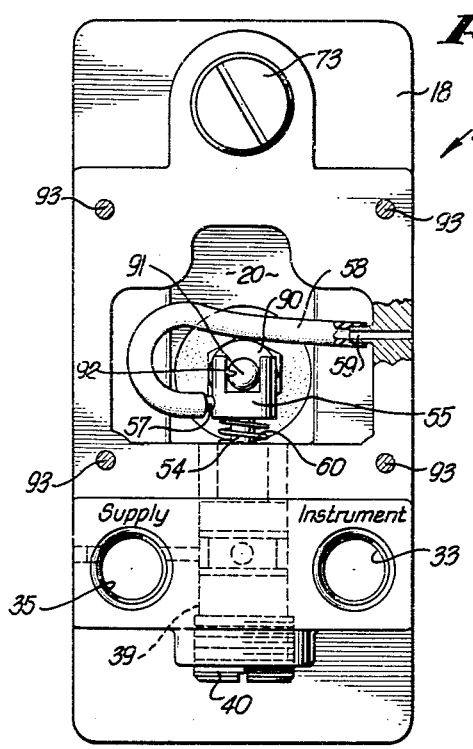
FIG. 10 is a front view of the pilot valve structure, with its cover removed.

In FIG. 1 there is illustrated a main valve structure 1a including the valve body 1 of conventional form. This body has a port 2 and a closure 3 cooperating with the port. The closure is supported on a stem 4 which is movable for varying or adjusting the opening of the valve structure. Such adjustment occurs in response to variations in fluid pressure conducted from a pilot valve 5 mounted upon the main valve structure.

The stem 4 extends upwardly to a tubular member 6 appropriately supported on a yoke 7 mounted on valve body 1. The tubular member 6 terminates in a cup-like member 8. This member 8 has a flange 14. The stem 4 is resiliently urged upwardly by a compression spring 9 which surrounds the stem 4. The lower end of the spring 9 rests upon a surface 10 formed in the tubular member 6.

The upper end of the stem 4 engages a cupped washer 11, contacting the lower surface of a diaphragm 12 made of flexible material. A flanged cover 13 clamps the edge of the diaphragm to the flange 14 of the cup 8.

In order to depress the diaphragm 12 and accordingly the stem 4, air pressure is supplied to the chamber formed on the upper side of the diaphragm 12, as by the aid of a conduit 15. This conduit 15 leads to the pilot valve 5, the function of which is to provide air under pressure through the conduit 15 for depressing the stem 4 against the pressure of spring 9. The position attained by the stem 4 is determined by the pressure of the air or so-called instrument air, which air is controlled by the pilot valve 5. An air conduit 16 leading to the pilot valve serves as a source of air supply.

Appropriately supported on the main valve structure is a plate or bracket 17 (FIGS. 1 and 2).

This plate 17 serves as a support for a pilot valve body 18, and may be fastened to the pilot valve body by machine screws 19 (FIG. 2).

The body 18 is substantially rectangular in form. It has an internal chamber 20 opening in the righthand face of the body 18 (FIGS. 3, 4 and 6). A cover member 21 is attached to the body member 18, as by screws 93, and overlies the chamber 20. A gasket 22 may be interposed between the body 18 and cover 21. The chamber 20, as shown most clearly in FIG. 4, narrows toward the left and opens in the left-hand side of the body 18. A flexible diaphragm or wall 23 covers this opening and is held in place by a clamp member 24 (FIGS. 2 and 6). Screws 25 hold this member in place. The clamp member has a pair of rectangular openings 64, 65, as well as a pair of circular openings 26, 27, exposing the diaphragm 23. This diaphragm is preferably made of Buna synthetic rubber.

Another chamber 28 is defined by the diaphragm 23 in cooperation with the valve body 18.

The chambers 20 and 28 are utilized, as hereinafter described, to perform control functions.

The chamber 20 is in communication with the conduit 15 by way of a fitting 30 (FIG. 1), which engages the threaded aperture 31 in cover member 21 (FIG. 3).

The chamber 28, as shown most clearly in FIG. 5, is in communication with a port 32 in body 18. This port is in communication with an aperture 33. This aperture 33 is threaded for a part of its depth. It is adapted to be connected by an appropriate fitting with "instrument air" via conduit 16 (FIG. 1). The air pressure in chamber 28, therefore, corresponds to the air pressure that is derived from an appropriate source of adjusted or varying pressure. It is in accordance with this air pressure that the position of the stem 4 is definitely determined.

Paralleling aperture 33, there is another aperture 35 in body 18 (FIGS. 5 and 10). Aperture 35 communicates with a port 36. By way of a fitting 34a (FIG. 1) and conduit 34, air under pressure can be supplied to chamber 20. This supply air has a pressure entirely independent of the pressure in the instrument air conduit 16.

Port 36 may be a drilled hole, the open end of which is plugged by an appropriate plug 37. The inner end of the port 36 is in communication with a bore 38 extending through the lower wall of the valve body 18 (FIGS. 3 and 5). This bore extends into the chamber 20.

Fixed into the bore 38 is a valve cage 39. This cage is of generally cylindrical configuration, having a threaded lower end 40 adapted to engage the threads formed at the lower end of the bore 38 (FIG. 6).

This cage has an annular groove 41 with which the port 36 is in communication (see also FIG. 5). The groove 41, in turn, is in communication with the radial ports 42 leading to a central bore 43 of the cage 39. On each side of the groove 41, the cage 39 carries sealing rings 52, 53 made of rubber or the like and located in shallow annular grooves. These rings isolate the air passages from port 36 against leakage.

A smaller diameter bore 44 extends upwardly from the bore 43 so as to form a valve seat 45. A ball valve closure 46 is arranged to seat on this valve seat, as shown in FIGS. 6 and 8. The ball valve closure 46 is urged to its seat by a light compression spring 48, bottomed in the hollow portion of a screw 49 which is threaded into the end of the cage 39. A head 50 for the screw 49 serves to limit the inward movement of the screw. A washer packing or gasket 51 is inserted between the head of the screw and the shoulder formed on the interior of the cage 39.

In the position of FIG. 6, which may be termed the neutral position, the ball 46 is seated, preventing supply air from reaching the interior of chamber 20. However, it may be pushed off its seat, as shown in FIG. 9, in which event supply air passes upwardly through the bore 44 and into the chamber 20.

In order to depress the ball 46 from its seat, use is made of a hollow sleeve 54 which extends upwardly and out of the upper portion of the cage 39. As shown in FIG. 7, the exterior of the sleeve 54 has flat sides to form an air passage between these sides and bore 44 for a purpose to be hereinafter described.

Attached to the top of the sleeve 54, as by threaded engagement, is a collar 55 (see also FIG. 10). This collar 55 has a radial opening 56 located above the sleeve 54. This radial opening 56 is provided with a fitting 57 (FIG. 10) connected, as by a hose 58, to a nipple 59 formed integrally with one of the walls of the casing 13. The aperture through the nipple connects with the outside atmosphere for providing a vent for the chamber 20.

Urging the collar 55 upwardly toward the position of FIG. 8 is a compression spring 60. The lower end of the compression spring 60 rests upon the shoulder 61a formed on the cage 39, and its upper end engages the lower surface of the collar 55.

In the positions of FIGS. 6 and 8, the ports 42 are out of communication with the interior of chamber 20, the ball 46 being seated. When the position of FIG. 8 is reached, the air from the chamber 20 is vented by passing between the outer surface of sleeve 54 and the bore 44, thence past the lower end of the sleeve 54 out through opening 56, fitting 57 and conduit 58 (FIG. 10).

Accordingly, in this position, air, as shown by the arrows of FIG. 8, is exhausted from the chamber 20. Under such circumstances, the air is exhausted via conduit 15 (FIG. 1) from above the diaphragm 12, and, accordingly, the spring 9 expands to move the stem 4 upwardly.

To cause the stem 4 to move downwardly, the collar 55 is depressed into the position of FIG. 9. In this position, the ball 46 is unseated from its seat, and the hollow sleeve 54 has its lower end contacting the ball 46 to close the vent to the radial opening 56. Since the ball 46 is urged off its seat against the pressure of spring 48, air can pass, as shown by the arrows, through the radial ports 42 past the sleeve 54, into the chamber 20, and thence through conduit 15 to the chamber above the diaphragm 12 of the main valve (FIG. 1). The pressure exerted on this diaphragm compresses spring 9.

In the neutral position of FIG. 6, the vent is closed because ball 46 seats upon the lower end of the sleeve 54. Furthermore, no supply air enters the chamber 20. Under such circumstances, the position of the main valve stem 4 is stationary.

Variations of instrument air pressure in chamber 20 serve to reposition the stem 4. A lever structure 61 is provided to translate the forces exerted by air pressures to effect this function. This lever structure is illustrated in FIGS. 2 to 9, inclusive.

This lever structure, as shown most clearly in FIG. 4, has a pair of spaced pivot bosses 62 and 63 extending into openings 64 and 65 (see also FIG. 2) of the cover member 24. Pivot screws 66 are threaded transversely to the openings 64 and 65 to engage appropriate apertures in the bosses 62 and 63 of the lever structure 61. The axis of the lever structure, as shown in FIG. 6, lies in a plane corresponding to the left-hand face of the body member 18.

The first arm 67 of the lever structure 61 is shown as having a central vane or rib 68. The arm extends vertically upwardly above the pivot axis.

At the upper end of the arm 67 (FIG. 3) is a recess 69 for the accommodation of a compression spring 70. This compression spring engages a concave disc or spring rest 71 located in a bore 72 formed in the body 18. The force of the spring 70 can be adjusted by the aid of a headless screw 73 engaging the right-hand threaded portion of the bore 72. The headless screw 73 is provided with a conical point 73a for engaging the concave side of the disc 71.

Depending vertically from the axis of the lever structure 61 is a second arm 74. This arm 74 is also provided with a rib 75, as illustrated most clearly in FIG. 5.

The lower end of the arm 74 carries a circular pad 76, entering opening 27 of clamping member 24. It engages the outer surface of the diaphragm 23. Accordingly, this pad 76 is subjected to a force corresponding to the pressure existing in chamber 28 which, in turn, is connected to instrument air.

A third arm is formed by a rod 78 (FIGS. 1, 3 and 4). This rod 78 has a threaded end 79 engaging the threaded boss 80 forming a part of the lever structure 61. A lock nut 80a serves to maintain the rod 78 firmly in place. This rod 78 has an aperture providing an upper anchor for a tension spring 81 (FIG. 1). This tension spring exerts a downward force on arm 78. The lower end of the spring is fastened to a nut 82 engaged by a threaded screw 83 having a head entering a groove 84 located in a block 85 attached to the stem 4 of the main valve. By adjusting the screw 83 when it is freed from the slot 84, the tension of the spring 81 may be adjusted.

In order that the position of the lever structure 61 determine the position of the ball closure 46, use is made of another arm 86 (FIG. 6). This arm is shown as provided with a threaded end 87 engaging a threaded aperture in an inwardly directed boss 88 of the lever structure 61. This threaded end 87 passes through an appropriate opening in the flexible diaphragm 23 which extends over the opening of the chamber 20. A lock washer 89 engages the right-hand side of the wall 23. This, in turn, is engaged by the hexagon-shaped extension 90 of the arm 86.

The right-hand end of the arm 86 is formed as a ball 91. This end is received in a slot 92 (FIGS. 6, 8, 9 and 10) formed in a continuation of the collar 55. Accordingly, when the lever structure 61 rotates in a clockwise direction as viewed in FIG. 6, the sleeve 54 is depressed to the position of FIG. 9. When it moves in a counterclockwise direction, the sleeve 54 is moved away from the ball 46.

In the neutral position of FIG. 6, the sleeve 54 is maintained so that the ball 46 is seated both on the lower end of the sleeve as well as on the seat 45. FIG. 8 illustrates a venting position, in which the stem moves upwardly; and FIG. 9, a position in which air under pressure passes through conduit 15 (FIG. 1) to urge the stem 4 downwardly.

Figure 11:
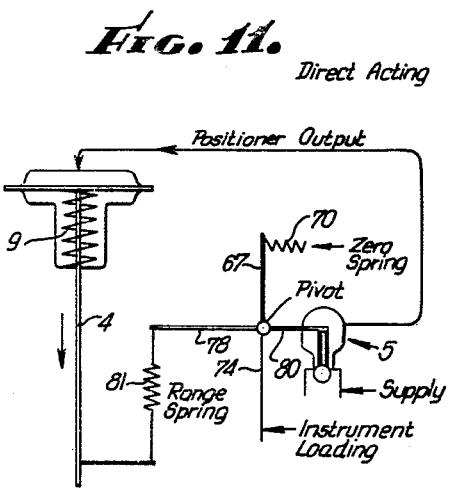
FIGS. 11 and 12 are diagrammatic views explaining several modes of operation of the pilot valve.

FIG. 11 illustrates diagrammatically the action of the pilot valve structure in controlling the main valve structure 1a. In this figure, the springs 79 and 81 exert torques tending to rotate the lever structure in a counterclockwise direction. Opposed to this is the instrument air torque, operating on arm 74 via chamber 28. This instrument air torque must be balanced by the torques operating on the arms 67 and 78. The stem 4 must move to a position where this balance is attained.

Thus, assuming that the instrument loading air pressure increases, the stem 4 must move downwardly in order to increase the torque on arm 78 until balance and a neutral position of FIG. 6 are attained. This corresponds to a new position in a downward direction of the stem 4. The position of the stem 4 is positively determined irrespective of the flow of fluid past the closure 3 of the main valve 1a. Thus, the flow conditions through the valve in no way affect the position of stem 4.

On the other hand, if the instrument air pressure decreases, the stem 4 must move upwardly in order to reduce the torque exerted on arm 78 for balancing the torques. This is effective by venting the chamber above the diaphragm 12 of FIG. 1 through the conduit 15. The lever structure 61 serves to open the vent from the pilot valve chamber 20. This is accomplished by a clockwise movement of this lever structure.

Figure 12:
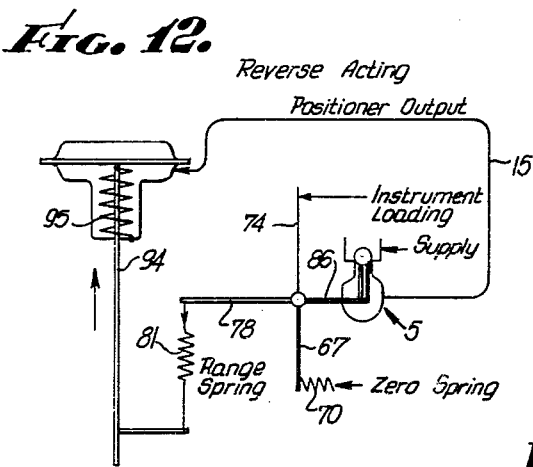

If it is desired to move the valve stem upwardly upon an increase of instrument air pressure rather than in a downward direction, this is readily accomplished by reversing the position of the pilot valve structure with respect to the main valve 12, as illustrated diagrammatically in FIG. 12. Thus, the fastening screws 19 (FIGS. 1 and 2) may be removed, and the entire pilot valve structure 5 may be reversed with respect to bracket 17.

In this figure, the valve stem 94 is adapted to be urged upwardly upon an increase in instrument loading pressure. This is effected by connecting the conduit 15 beneath the diaphragm 12 of the valve; and the spring is under tension urging the stem 94 downwardly.

When the instrument loading pressure increases, the lever structure 61 is urged counterclockwise from the neutral or balanced position. Such a counterclockwise rotation causes influx of supply air to the pilot valve chamber. This causes diaphragm 12 to move upwardly, the tension of the spring 95 increasing, and the stem 44 to move upwardly. This upward movement serves to reduce the tension of range spring 81. Ultimately, a balance of the torques is established, and the ball closure 46 returns to the neutral position of FIG. 6.

Upon a decrease in instrument loading, the combined effect of the zero spring 79 and the range spring 81 overcomes the torque on arm 74 and urges the lever structure 61 in a clockwise direction. This permits evacuation of the pilot valve chamber 20, and an attendant downward movement of the stem 94, increasing the effect of range spring 81. As soon as equilibrium is established, the position of FIG. 6 is attained.

Adjustment of the zero spring 79 provides the point at which equilibrium is attained and corresponds to the adjusted "zero" position of the main valve stem for a definite value of instrument air pressure.

Adjustment of the range spring 81 determines the extent of movement of the stem to attain the neutral or balanced position.

The inventor claims:

1. In a pilot valve structure: a casing having a chamber and a bore extending into said chamber; means forming a pair of ports, one of said ports communicating with the chamber and the other of said ports intersecting said bore, said ports being adapted to be subjected to different pressures; means forming a motor port from the chamber; a valve cage fitted into the casing bore at the location of said other port; said cage having a passage therein opening at one end into said chamber and at the other end peripherally of the cage at a place registering with the said other bore; a valve closure in said cage passage intermediate the ends thereof and cooperating with a seat formed in the passage, said closure when seated on said seat preventing ingress of fluid into the casing; a spring mounted at the outer end of the cage for urging said closure against said cage seat; a hollow axially movable sleeve inserted with clearance into the said one end of said cage passage and having one end engageable with the closure for urging said closure to open position when the sleeve is moved inwardly of the cage as well as for closing the said one end of said sleeve; said sleeve when withdrawn from the closure causing the interior of the sleeve to be connected to the chamber; a flexible conduit connected to the other end of the sleeve and said one of said ports in the wall of the casing; and an actuator in the chamber for positioning the sleeve.

2. In a pilot valve for operating a fluid motor: a pivoted lever structure having an axis of angular movement, as well as a first arm; an adjustable spring urging the first arm in one direction about the axis; said lever structure having a second arm; fluid pressure means urging said second arm in the opposite direction about the axis; said lever structure having a third arm; a spring for connecting said third arm to the fluid motor and exerting a torque upon the third arm in a direction to assist the angular movement of one of the other two arms in proportion to the position of the fluid motor; and pilot valve means coupled to the lever structure to provide fluid or to release fluid from the main valve until equilibrium between all of the arms is attained for causing the lever structure to become stationary.

3. In combination: a pilot valve body having walls forming a first chamber; said chamber having a vent, an outlet and an inlet; a valve structure supported by the body and having a movable operator with three positions respectively (a) to close the vent and inlet, (b) to open the vent and close the inlet and (c) to close the vent and open the inlet; means for conducting fluid under pressure to the inlet; said body having a second chamber and an inlet to said second chamber; a flexible wall covering said chamber; a lever for moving said operator, and having a first arm; the exterior side of said flexible wall contacting said first arm to urge said lever in one direction; a connection between the operator and the first arm; said lever having a second arm; and a spring operating said second arm to urge the lever angularly in a direction opposite to said one direction.

4. The combination as set forth in claim 3, in which the wall defining the first chamber includes a flexible portion, the operator being joined to the lever through said flexible portion.

5. In a pilot valve for operating a fluid motor: a pilot valve body having walls forming a first chamber; said chamber having a vent, an outlet and an inlet; a valve structure supported by the body and having a movable operator with three positions respectively (a) to close the vent and inlet, (b) to open the vent and close the inlet and (c) to close the vent and open the inlet; means for conducting fluid under pressure to the inlet; said body having a second chamber and an inlet to said second chamber; a flexible wall covering said chamber; a lever for moving said operator, and having a first arm; the exterior side of said flexible wall contacting said first arm to urge said lever in one direction; a connection between the operator and the first arm; said lever having a second arm; and a spring operating said second arm to exert a torque to urge the lever angularly in a direction opposite to said one direction and in proportion to the position of the fluid motor.

6. In a pilot valve structure for a follow-up fluid motor: a pilot valve body having a first chamber adapted to communicate with the fluid motor; said body having an access opening to the first chamber; a first flexible diaphragm sealing the access opening; a lever pivoted on the body for limited angular movement about an axis first diaphragm; said lever having parts respectively extending on opposite sides of the first diaphragm with one part within the first chamber and the other part beyond the first chamber; said pilot valve body having a second chamber spaced from said axis and separated from said first chamber, said second chamber being adapted to be subjected to a control pressure and having an opening; a second flexible diaphragm sealing said opening of said second chamber; said lever having a pad area overlying the said second diaphragm for transmission of torque to the lever in accordance with the control pressure; a spring adjustably mounted by said body at a place spaced from said axis and engaging the said other part of said lever for exerting an opposing torque on said lever; means forming a pressure port to and a vent port from said first chamber; valve means in the first chamber controlling said ports; the said one lever part actuating said valve means in accordance with the angular position of said lever about its pivotal axis to close both of the ports at a neutral position and to open the ports respectively upon movement of the lever in opposite angular directions from said neutral position; and means for exerting a torque on said other lever part in proportion to the position of said fluid motor.

7. The combination as set forth in claim 6 in which said valve body has a surface at which said access opening and the opening of said second chamber are located, and in which said diaphragms are formed as parts of a unitary whole.

8. In a pilot valve structure for a follow-up fluid motor: a pilot valve body having a first chamber adapted to communicate with the fluid motor; said body having an access opening to the first chamber; a first flexible diaphragm sealing the access opening; a lever pivoted on the body for limited angular movement about an axis substantially parallel to and adjacent the center of the first diaphragm; said lever having parts respectively extending on opposite sides of the first diaphragm with one part within the first chamber and the other part beyond the first chamber; said pilot valve body having a second chamber spaced from said axis and separated from said first chamber, said second chamber being adapted to be subjected to a control pressure and having an opening; a second flexible diaphragm sealing said opening of said second chamber; said lever having a pad area overlying the said second diaphragm for transmission of torque to the lever in accordance with the control pressure; said body having a through opening spaced from said axis; a compression spring in the through opening; a plug mounted at one end of said through opening and forming a seat for said compression spring; said lever having a part overlying the other end of said through opening; said spring exerting an opposing torque upon said lever; means forming a pressure port to and a vent port from said first chamber; valve means in the first chamber controlling said ports; the said one lever part actuating said valve means in accordance with the angular position of said lever about its pivotal axis to close both of the ports at a neutral position and to open the ports respectively upon movement of the lever in opposite angular directions from said neutral position; and means for exerting a torque on said other lever part in proportion to the position of said fluid motor.

9. The combination as set forth in claim 8 in which said valve body has a surface at which said access opening is located, said opening of said second chamber being located at said surface on one side of said axis, and said other end of said through opening being located at said surface on the other side of said axis.

10. In a pilot valve structure for a follow-up fluid motor: a pilot valve body having a chamber adapted to communicate with the fluid motor; said body having an access opening to the first chamber; a flexible diaphragm sealing the access opening; a lever pivoted on the body for limited angular movement about an axis substantially parallel to and adjacent the center of the diaphragm; said lever having parts respectively extending on opposite sides of the first diaphragm with the inner part within the chamber and the outer part beyond the chamber; means subjecting the outer part of the lever to a torque corresponding to a control pressure; means for exerting an opposing adjustable torque upon said lever; means forming a pressure port and a vent port for the chamber; valve means in the chamber controlling said ports; the inner lever part actuating said valve means in accordance with the angular position of said lever about its pivotal axis to close both of said ports at a neutral position and to open the ports respectively upon movement of the lever in opposite angular directions from said neutral position; and means for exerting a torque on said lever in proportion to the position of said fluid motor.

References Cited in the file of this patent

UNITED STATES PATENTS

| | | |
|---|---|---|
| 1,890,494 | Borden | Dec. 13, 1932 |
| 2,169,150 | Johnson | Aug. 8, 1939 |
| 2,264,262 | Erbguth | Nov. 25, 1941 |
| 2,377,300 | Pray | May 29, 1945 |
| 2,575,085 | Alyea | Nov. 13, 1951 |
| 2,681,076 | Osburn | June 15, 1954 |
| 2,754,843 | Hauber | July 17, 1956 |
| 2,789,543 | Popowsky | Apr. 23, 1957 |
| 2,841,178 | Schultz | July 1, 1958 |
| 2,896,664 | Tieser | July 28, 1959 |
| 2,905,198 | Peeps et al. | Sept. 22, 1959 |
| 2,991,801 | Larsson | July 11, 1961 |
| 2,999,513 | Oetiker | Sept. 12, 1961 |
| 3,003,475 | Ronvalis | Oct. 10, 1961 |
| 3,071,394 | Miller | Jan. 1, 1963 |
| 3,087,468 | Roberts et al. | Apr. 30, 1963 |
| 3,091,257 | Ballard et al. | May 28, 1963 |

FOREIGN PATENTS

| | | |
|---|---|---|
| 16,061 | Great Britain | Oct. 2, 1902 |